United States Patent [19]
Sen et al.

[11] Patent Number: 6,111,041
[45] Date of Patent: Aug. 29, 2000

[54] PALLADIUM (II) CATALYIZED POLYMERIZATION OF NORBORNENE AND ACRYLATES

[75] Inventors: Ayusman Sen, State College, Pa.; Smita Kacker, Annandale, N.J.; April Hennis, State College, Pa.; Jennifer D. Polley, Exton, Pa.

[73] Assignee: The Penn State Research Foundation, University Park, Pa.

[21] Appl. No.: 09/099,070

[22] Filed: Jun. 17, 1998

(Under 37 CFR 1.47)

Related U.S. Application Data

[60] Provisional application No. 60/050,107, Jun. 18, 1997.
[51] Int. Cl.⁷ ........................................ C08F 4/80
[52] U.S. Cl. .................. 526/171; 526/172; 526/328; 526/329; 526/329.7; 526/281
[58] Field of Search .................... 526/171, 172, 526/328, 329, 329.7, 281

[56] References Cited

U.S. PATENT DOCUMENTS 6,034,259  3/2000  Brookhart et al. ...................... 556/137

FOREIGN PATENT DOCUMENTS

837079 A2  4/1998  European Pat. Off. .

*Primary Examiner*—David W. Wu
*Assistant Examiner*—Caixia Lu-Rutt
*Attorney, Agent, or Firm*—Thomas J. Monahan

[57] ABSTRACT

Homopolymers or copolymers of acrylates, homopolymers or copolymers of norbornenes, and copolymers of acrylates with norbornenes, may be prepared by contacting acrylate and/or norbornene monomer reactant under polymerization conditions and in the presence of a solvent with a catalyst system consisting essentially of a Pd(II) dimer component having the formula:

$$[(L)Pd(R)(X)]_2,$$

where L is a monodentate phosphorus or nitrogen ligand, X is an anionic group, and R is an alkyl or aryl group.

30 Claims, No Drawings

PALLADIUM (II) CATALYIZED POLYMERIZATION OF NORBORNENE AND ACRYLATES

This application claims the benefit of U.S. Provisional No. 60/050,107 filed Jun. 18, 1997.

FIELD OF THE INVENTION

This invention relates to a novel catalyst that is suitable for use in the homopolymerization of norbornenes, in the homopolymerization of acrylates, and in the copolymerization of norbornenes with acrylates. The invention relates, further, to a process for homopolymerizing norbornenes and acrylates using the present catalyst, to a process for copolymerizing norbornenes with acrylates using the present catalyst, and to novel copolymers of norbornenes with acrylates.

BACKGROUND OF THE INVENTION

Considerable interest has existed in the copolymerization of acrylates with norbornenes because of the potential benefits of combining the useful properties of the homopolymers of the two monomers. For example, polyacrylates are valued for their extreme hardness and adhesive properties, and are used to form clear, glass-like materials such as Lucite® and Plexiglas®. Polynorbornenes, on the other hand, are capable of resisting high temperatures and, thus, typically are employed in applications that necessitate high-temperature stability.

Until the present invention, attempts to copolymerize acrylates with norbornenes have been unsuccessful because of a disparity in the mechanisms by which the respective monomers polymerize. Typically, acrylates polymerize in the presence of radical or anionic initiators, whereas norbornenes do not follow radical pathways and normally are polymerized by cationic or insertion mechanisms. Therefore, in order to affect the copolymerization of acrylates with norbornenes, it was necessary to develop a catalyst system that would be effective for polymerizing both types of monomers.

SUMMARY OF THE INVENTION

It is an object of the present invention to provide a catalyst system that is capable of copolymerizing acrylates with norbornenes.

It is another object to provide a catalyst system that is useful for the homopolymerization of both acrylate monomers and norbornenes.

It is yet another object to provide a novel catalyst system that is useful both for the homopolymerizing of acrylate monomers and norbornene monomers, and for the copolymerization of acrylates with norbornenes.

Still another object of the invention is to provide novel copolymers of acrylates with norbornenes.

DETAILED DESCRIPTION OF THE INVENTION

The above and other objects and advantages of the invention are accomplished in one embodiment by providing a Pd(II)-based catalyst system which homopolymerizes acrylates to high molecular weight polymers, which homopolymerizes norbornenes to polymers, and which copolymerizes acrylates with norbornenes to high molecular weight polymers. The copolymers prepared in accordance with this invention are characterized by advantages and properties attributable to the respective acrylate and norbornene monomers from which they are derived. The copolymers can be tailored in norbornene to acrylate ratio by varying the ratio of the respective monomers in the reaction mixture and by varying the ligands utilized in the catalyst system.

As used in this specification and claims, the term "acrylates" is meant to include compounds of the general formula $H_2C=CHCOOR$, where R is an alkyl group, such as methyl ($CH_3$), ethyl ($CH_2CH_3$), propyl ($CH_2CH_2CH_3$), n-butyl ($CH_2CH_2CH_2CH_3$) or t-butyl ($C-(CH_3)_3$), or an aryl group, such as phenyl ($C_6H_6$) or p-tolyl ($C_7H_8$). Other acrylates which do not conform to the above formula, but which are nonetheless suitable for use in the present invention and are intended to be included within the scope of the term "acrylates", include such acrylates as 2-hydroxy ethyl methacrylate and methyl methacrylate. Specific, non-limiting examples of acrylates contemplated for use in the present invention include methyl acrylate, ethyl acrylate, n-propyl acrylate, n-butyl acrylate, t-butyl acrylate, acrylamide, 2-hydroxy ethyl methacrylate, methyl methacrylate, acrolein, ethyl methacrylate, acryloyl chloride and phenyl acrylate.

The term "norbornenes" is meant to include norbornene, as well as norbornene derivatives, such as norbornadiene and compounds conforming to the general formulas 5-norbornene-2-$R^{1a}$, 5-norbornene-2,2-$R^{1a}$, 5-norbornene-3-$R^{1a}$, 5-norbornene-3,3-$R^{1a}$, 5-norbornene-2,3-$R^{1a}$, or 5-norbornene-2-$R^{1a}$-3-$R^{1b}$, where $R^{1a}$ and $R^{1b}$, independently, represent an alkyl or aryl group. Specific, non-limiting examples of norbornenes contemplated for use in the present invention include norbornene, 5-norbornene-2-methanol, cis-5-norbornene-endo-2,3-dicarboxylic anhydride, 5-norbornene-2,2-dimethanol, 5-norbornen-2-ol, norbornadiene, 5-norbornene-2,3-diphenyl, cis-5-norbornene-endo-2,3-dicarboxylic acid dimethyl ester, 5-norbornen-2-yl-acetate and 5-norbornene-2-carboxyaldehyde.

The Pd(II)-based catalyst system of the present invention is a dimer catalyst that may be characterized by the formula $[(L)Pd(R)(X)]_2$.

In this dimer catalyst, L is a monodentate phosphorus or nitrogen ligand. In general, suitable monodentate phosphorus ligands are those which conform to the formula $R^2_3P$, where $R^2$ is alkyl and/or aryl group. Non-limiting examples of such monodentate phosphorus ligands include triphenyl phosphine ($PPh_3$), tricyclohexyl phosphine ($PCy_3$), trimethyl phosphine ($PMe_3$), triethyl phosphine ($PEt_3$), tri-n-propyl phosphine ($P(n-Pr)_3$), tri-n-butyl phosphine ($P(n-Bu)_3$), tri-t-butyl phosphine ($P(t-Bu)_3$) and tri-p-tolyl phosphine ($P(p-Tol)_3$). Specific, non-limiting examples of mixed alkyl and aryl phosphines that are suitable for use in the invention include methyldiphenyl phosphine ($P(Me)(Ph)_2$), phenyldimethyl phosphine ($PPh(Me)_2$), ethyldiphenyl phosphine ($P(Et)(Ph)_2$), and ethyldiphenyl phosphine ($PPh(Et)_2$).

Generally, monodentate nitrogen ligands which may be used in the present invention are aromatic or heterocyclic amines, such as pyridine, t-butyl pyridine, aniline, trimethyl aniline and imidazole, or compounds that conform to the formula $R^3_3N$, where $R^3$ is an alkyl group, such as methyl ($CH_3$), ethyl ($CH_2CH_3$), propyl ($CH_2CH_2CH_3$), n-butyl ($CH_2CH_2CH_2CH_3$), or t-butyl ($C-(CH_3)_3$), or an aryl group, such as phenyl ($C_6H_6$) or p-tolyl ($C_7H_8$).

X is an anionic group, such as chlorine or bromine, or a carboxylate, such as acetate, propionate, trifluoroacetate, and benzoate; and R is an alkyl group, such as methyl ($CH_3$), ethyl ($CH_2CH_3$), propyl ($CH_2CH_2CH_3$), n-butyl ($CH_2CH_2CH_2CH_3$), or t-butyl ($C-(CH_3)_3$), or an aryl group, such as phenyl ($C_6H_6$) or p-tolyl ($C_7H_8$).

Typically, the catalyst is formed by reaction of 1 equivalent of the monodentate ligand with [(1,5-cyclooctadiene)Pd(Me)(X)] in situ, as illustrated by the equation (using X=chlorine):

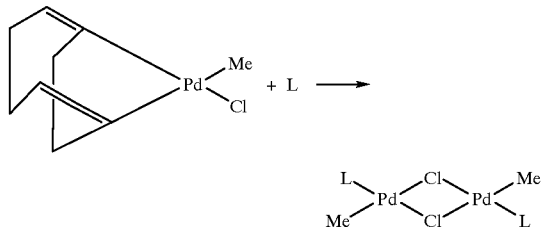

Catalyst formation may be monitored by $^1H$ and $^{31}P\{^1H\}$ NMR. For the $PCy_3$ analog, the movement of the methyl signal in the proton spectrum from a singlet at 1.12 ppm in the starting material to a triplet at 0.11 ppm in the dimer upon addition of 1 equivalent $PCy_3$ indicates the formation of the desired product. Additionally, the appearance of uncoordinated 1,5-cyclooctadiene signals at 5.55 and 2.34 ppm in the proton NMR and a 25.6 ppm $^{31}P\{^1H\}$ NMR signal for $[(PCy_3)Pd(Me)(Cl)]_2$ are observed.

The relevance of the alkyl (or aryl) group in the present dimer catalyst system was explored by attempting to homopolymerize methyl acrylate using a dimer catalyst that was devoid of alkyl (or aryl) groups. It was found that methyl acrylate would not polymerize when reacted in the presence of a Pd(II) catalyst that was prepared by reacting [(1,5-cyclooctadiene)Pd(Cl)$_2$] with 1 equivalent of tricyclohexyl phosphine ($PCy_3$). This indicated that the alkyl (or aryl) group is essential to the polymerization mechanism.

The copolymers of the present invention may be tailored in norbornene to acrylate ratio by varying the ratio of the respective monomers in the reaction mixture and by varying the ligands utilized in the catalyst system. Typically, the ratio of norbornene monomer to acrylate monomer in the starting mixture is from about 100:1 to about 1:100. In preferred aspects of the invention, the ratio of norbornene monomer to acrylate monomer that is added to the reactor is from about 10:1 to about 1:10.

The polymerization preferably is carried out in the liquid phase using a solvent, such as dichloromethane ($CH_2Cl_2$), benzene ($C_6H_6$), chlorobenzene ($C_6H_5Cl$) or hexane ($C_6H_{14}$). Other solvents which may be used as the polymerization medium include, for example, pentane ($C_5H_{12}$), toluene ($C_7H_8$), and chloroform ($CHCl_3$).

The polymerization in accordance with this invention may be carried out at temperatures ranging from about 0 to about 200° C. Typically, however, the polymerization will be carried out at a temperature of from about 30 to about 80° C., e.g., about 50° C. The pressure at which the polymerization is carried out is not critical.

The various aspects of the invention will be appreciated more fully in light of the following illustrative examples:

EXAMPLE 1

[(1,5-cyclooctadiene)Pd(Me)(Cl)]/PPh$_3$/methyl acrylate in $CH_2C_2$

In a glove box, under an inert atmosphere (nitrogen), [(1,5-cyclooctadiene)Pd(Me)(Cl)](0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of $CH_2Cl_2$, and the mixture was gently swirled to dissolve the starting materials and to form a clear, colorless solution. Next, 1 g (1.2×10$^{-2}$ mol) of methyl acrylate was added to the solution and the flask was sealed with a rubber septum and placed in a 50° C. oil bath for 24 hours. Polymer product was obtained by precipitating in methanol, then decanting off liquid and drying under reduced pressure at room temperature. The polymer product was Soxhlet extracted in ether for 16 hours and dried under a vacuum. 0.910 g of polymer product was obtained. The product had a number average molecular weight ($M_n$)=510,000 and a molecular weight distribution ($M_w/M_n$, where $M_w$ is the weight average molecular weight)=1.3.

EXAMPLE 2

[(1,5-cyclooctadiene)Pd(Me)(Cl)]/PPh$_3$/norbornene in benzene

In a glove box, under an inert atmosphere (nitrogen), [(1,5-cyclooctadiene)Pd(Me)(Cl)](0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of benzene, and the mixture was gently swirled to dissolve the starting materials and to form a clear, colorless solution. Next, 1 g (1.06×10$^{-2}$ mol)of norbornene was added to the solution, which changed to transparent yellow in appearance. The flask was then sealed with a rubber septum and placed in a 50° C. oil bath for 24 hours. Polymer product was obtained by precipitating in methanol, then decanting off liquid and drying under reduced pressure at room temperature. 0.983 g of polymer product was obtained. The product had a number average molecular weight ($M_n$)=2,000.

EXAMPLE 3

[(1,5-cyclooctadiene)Pd(Me)(Cl)]PCy$_3$/methyl acrylate in $CH_2Cl_2$

The procedure of Example 1 was followed, except that PCy$_3$ (0.21 g, 7.56×10$^{-5}$ mol) was added to the reaction flask instead of PPh$_3$.0.784 g of polymer product was obtained.

EXAMPLE 4

[(1,5-cyclooctadiene)Pd(Me)(Cl)]/PCy$_3$/norbornene in benzene

The procedure of Example 2 was followed, except that PCy$_3$ (0.21 g, 7.56×10$^{-5}$ mol) was added to the reaction flask instead of PPh$_3$.0.803 g of polymer product was obtained.

EXAMPLE 5

[(1,5-cyclooctadiene)Pd(Me)(Cl)]/PMe$_3$/methyl acrylate in $CH_2Cl_2$

The procedure of Example 1 was followed, except that one drop of a 1M solution PMe$_3$ in toluene was added to the reaction flask instead of PPh$_3$.0.420 g of polymer product was obtained.

EXAMPLE 6

[(1,5-cyclooctadiene)Pd(Me)(Cl)]/PMe$_3$/norbornene in benzene

The procedure of Example 2 was followed, except that one drop of a 1M solution of PMe$_3$ in toluene was added to the reaction flask instead of PPh$_3$.0.861 g of polymer product was obtained.

EXAMPLE 7

[(1,5-cyclooctadiene)Pd(Me)(Cl)]/pyridine/methyl acrylate in CH$_2$Cl$_2$

In a glove box, under an inert atmosphere (nitrogen), [(1,5-cyclooctadiene)Pd(Me) (Cl)](0.035 g, $1.32 \times 10^{-4}$ mol) was placed into a 25 mL round bottom flask. To this was added 1 equivalent of pyridine (0.010 g, $1.32 \times 10^{-4}$ mol), followed by 3 mL of CH$_2$Cl$_2$, and the mixture was gently swirled to dissolve the starting materials and to form a clear, colorless solution. Next, 1 g ($1.2 \times 10^{-2}$ mol) of methyl acrylate was added to the solution and the flask was sealed with a rubber septum and placed in a 50° C. oil bath for 24 hours. Polymer product was obtained by precipitating in methanol, then decanting off liquid and drying under reduced pressure at room temperature. 0.490 g of polymer product was obtained.

EXAMPLE 8

[(1,5-cyclooctadiene)Pd(Me)(Cl)]/pyridine/ norbornene in benzene

In a glove box, under an inert atmosphere (nitrogen), [(1,5-cyclooctadiene)Pd(Me)(Cl)](0.035 g, $1.32 \times 10^{-4}$ mol) was placed into a 25 mL round bottom flask. To this was added 1 equivalent of pyridine (0.010 g, $1.32 \times 10^{-4}$ mol), followed by 3 mL of benzene, and the mixture was gently swirled to dissolve the starting materials, thus forming a clear, colorless solution. Next, 1 g ($1.2 \times 10^{-2}$ mol) of norbornene was added to the solution, which changed to transparent yellow in appearance. The flask was then sealed with a rubber septum and placed in a 50° C. oil bath for 24 hours. Polymer product was obtained by precipitating in methanol, then decanting off liquid and drying under reduced pressure at room temperature. 0.643 g of polymer product was obtained.

EXAMPLE 9

[(1,5-cyclooctadiene)Pd(Me)(Cl)]/PPh$_3$/methyl acrylate/norbornene in CH$_2$Cl$_2$ (10:1 methyl acrylate: norbornene)

In a glove box, under an inert atmosphere (nitrogen), [(1,5-cyclooctadiene)Pd(Me)(Cl)](0.020 g, $7.56 \times 10^{-5}$ mol) was placed into a 25 mL round bottom flask. To this was added 1 equivalent of PPh$_3$ (0.020 g, $7.56 \times 10^{-5}$ mol), followed by 3 mL of CH$_2$Cl$_2$, and the mixture was gently swirled to dissolve the starting materials, thus forming a clear, colorless solution. Next, 1.000 g ($1.2 \times 10^{-2}$ mol) of methyl acrylate and 0.113 g ($1.2 \times 10^{-3}$ mol) of norbornene were dissolved in each other in a beaker, and the resulting solution was added to the flask containing the dissolved [(1,5-cyclooctadiene)Pd(Me)(Cl)] and PPh$_3$. The flask was sealed with a rubber septum and placed in a 50° C. oil bath for 24 hours. Polymer product was obtained by precipitating in methanol, then decanting off liquid and drying under reduced pressure at room temperature. The polymer product was Soxhlet extracted in ether for 16 hours and dried under a vacuum to obtain 0.120 g product. The product had a number average molecular weight (M$_n$)=429,700 and a molecular weight distribution (M$_w$/M$_n$)=2.1.

EXAMPLE 10

[(1,5-cyclooctadiene)Pd(Me)(Cl)]/PPh$_3$/methyl acrylate/norbornene in CH$_2$Cl$_2$ (5:1 methyl acrylate: norbornene)

The procedure of Example 9 was repeated, except that 0.800 g ($9.3 \times 10^{-3}$ mol) of methyl acrylate and 0.175 g ($1.86 \times 10^{-3}$ mol) of norbornene were added to the reaction solution. 0.630 g of polymer product was obtained. The product had a number average molecular weight (M$_n$)=380,000 and a molecular weight distribution (M$_w$/M$_n$)=2.0.

EXAMPLE 11

[(1,5-cyclooctadiene)Pd(Me)(Cl)]/PPh$_3$/methyl acrylate/norbornene in CH$_2$Cl$_2$ (1:1 methyl acrylate: norbornene)

The procedure of Example 9 was repeated, except that 1.000 g ($1.2 \times 10^{-2}$ mol) of methyl acrylate and 1.130 g ($1.2 \times 10^{-2}$ mol) of norbornene were added to the reaction solution. 0.770 g of polymer product was obtained. The product had a number average molecular weight (M$_n$)=60,400 and a molecular weight distribution (M$_w$/M$_n$)=1.7.

EXAMPLE 12

[(1,5-cyclooctadiene)Pd(Me)(Cl)]/PPh$_3$/methyl acrylate/norbornene in CH$_2$Cl$_2$ (1:5 methyl acrylate: norbornene)

The procedure of Example 9 was repeated, except that 0.183 g ($2.13 \times 10^{31\ 2}$ mol) of methyl acrylate and 1.000 g ($1.06 \times 10^{-2}$ mol) of norbornene were added to the reaction solution. 0.160 g of polymer product was obtained. The product had a number average molecular weight (M$_n$)=122,000 and a molecular weight distribution (M$_w$/M$_n$)=1.5.

EXAMPLE 13

[(1,5-cyclooctadiene)Pd(Me)(Cl)]/PPh$_3$/methyl acrylate/norbornene in CH$_2$Cl$_2$ (1:10 methyl acrylate: norbornene)

The procedure of Example 9 was repeated, except that 0.082 g ($9.57 \times 10^{-4}$ mol) of methyl acrylate and 0.900 g ($9.57 \times 10^{-3}$ mol) of norbornene were added to the reaction solution. 0.130 g of polymer product was obtained. The product had a number average molecular weight (M$_n$)=274,400 and a molecular weight distribution (M$_w$/M$_n$)=1.5.

EXAMPLE 14

[(1,5-cyclooctadiene)Pd(Me)(Cl)]/PCy$_3$/methyl acrylate/norbornene in CH$_2$Cl$_2$ (10:1 methyl acrylate: norbornene)

In a glove box, under an inert atmosphere (nitrogen), [(1,5-cyclooctadiene)Pd(Me)(Cl)] (0.020 g, $7.56 \times 10^{-5}$ mol) was placed into a 25 mL round bottom flask. To this was added 1 equivalent of PCy$_3$ (0.021 g, $7.93 \times 10^{-5}$ mol), followed by 3 mL of CH$_2$Cl$_2$, and the mixture was gently swirled to dissolve the starting materials, thus forming a clear, colorless solution. Next, 1.500 g ($1.7 \times 10^{-2}$ mol) of methyl acrylate and 0.160 g ($1.7 \times 10^{-3}$ mol) of norbornene were dissolved in each other in a beaker, and the resulting solution was added to the flask containing the dissolved [(1,5-cyclooctadiene)Pd(Me)(Cl)] and PCy$_3$. The flask was sealed with a rubber septum and placed in a 50° C. oil bath for 24 hours. Polymer product was obtained by precipitating in methanol, then decanting off liquid and drying under reduced pressure at room temperature. The polymer product was Soxhlet extracted in ether for 16 hours and dried under a vacuum to obtain 0.410 g product. The product had a number average molecular weight (M$_n$)=429,700 and a molecular weight distribution (M$_w$/M$_n$)=2.1.

EXAMPLE 15

[(5-cyclooctadiene)Pd(Me)(Cl)]/PCy$_3$/methyl acrylate/norbornene in CH$_2$Cl$_2$ (5:1 methyl acrylate: norbornene)

The procedure of Example 14 was repeated, except that 1.500 g ($1.7 \times 10^{-2}$ mol) of methyl acrylate and 0.328 g (3.49×10$^{-3}$ mol) of norbornene were added to the reaction solution. 0.440 of polymer product was obtained. The product had a number average molecular weight ($M_n$)=238,500 and a molecular weight distribution ($M_w/M_n$)=1.5.

EXAMPLE 16

[(1,5-cyclooctadiene)Pd(Me)(Cl)]/PCy$_3$/methyl acrylate/norbornene in CH$_2$Cl$_2$ (1:1 methyl acrylate: norbornene)

The procedure of Example 14 was repeated, except that 1.00 g (1.2×10$^{-2}$ mol) of methyl acrylate and 1.140 g (1.2×10$^{-2}$ mol) of norbornene were added to the reaction solution. 0.480 g of polymer product was obtained. The product had a number average molecular weight ($M_n$)=39,800 and a molecular weight distribution ($M_w/M_n$)=1.8.

EXAMPLE 17

[(1,5-cyclooctadiene)Pd(Me)(Cl)]/PCy$_3$/methyl acrylate/norbornene in CH$_2$Cl$_2$ (1:5 methyl acrylate: norbornene)

The procedure of Example 14 was repeated, except that 0.183 g (2.13×10$^{-3}$ mol) of methyl acrylate and 1.000 g (1.06×10$^{-2}$ mol) of norbornene were added to the reaction solution. 0.160 g of polymer product was obtained. The product had a number average molecular weight ($M_n$)=24,000 and a molecular weight distribution ($M_w/M_n$)=1.5.

EXAMPLE 18

[(1,5-cyclooctadiene)Pd(Me)(Cl)]/PCy$_3$/methyl acrylate/norbornene in CH$_2$Cl$_2$ (1:10 methyl acrylate: norbornene)

The procedure of Example 14 was repeated, except that 0.137 g (1.60×10$^{-3}$ mol) of methyl acrylate and 1.500 g (1.6×10$^{-2}$ mol) of norbornene were added to the reaction solution. 0.040 g of polymer product was obtained. The product had a number average molecular weight ($M_n$)=1,000.

EXAMPLE 19

[(1,5-cyclooctadiene)Pd(Me)(Cl)]/PMe$_3$/methyl acrylate/norbornene in CH$_2$Cl$_2$ (10:1 methyl acrylate: norbornene)

In a glove box, under an inert atmosphere (nitrogen), [(1,5-cyclooctadiene)Pd(Me)(Cl)] (0.020 g, 7.56×10$^{-5}$ mol) was placed into a 25 mL round bottom flask. To this was added 1 drop of 1M PMe$_3$ in toluene, followed by 3 mL of CH$_2$Cl$_2$. The mixture was gently swirled to dissolve the starting materials, thus forming a clear, colorless solution. Next, 1.500 g (1.7×10$^{-2}$ mol) of methyl acrylate and 0.160 g (1.7×10$^{-3}$ mol) of norbornene were dissolved in each other in a beaker, and the resulting solution was added to the flask containing the [(1,5-cyclooctadiene)Pd(Me)(Cl)] and PMe$_3$. The flask was sealed with a rubber septum and placed in a 50° C. oil bath for 24 hours. Polymer product was obtained by precipitating in methanol, then decanting off liquid and drying under reduced pressure at room temperature. The polymer product was Soxhlet extracted in ether for 16 hours and dried under a vacuum. 0.230 g of polymer product was obtained. The product had a number average molecular weight ($M_n$)=363,700 and a molecular weight distribution ($M_w/M_n$)=1.4.

EXAMPLE 20

[(1,5-cyclooetadiene)Pd(Me)(Cl)]/PMe$_3$/methyl acrylate/norbornene in CH$_2$Cl$_2$ (5:1 methyl acrylate: norbornene)

The procedure of Example 19 was repeated, except that 1.500 g (1.7×10$^{-2}$ mol) of methyl acrylate and 0.328 g (3.49×10$^{-3}$ mol) of norbornene were added to the reaction solution. 0.440 g of polymer product was obtained. The product had a number average molecular weight ($M_n$)=249,500 and a molecular weight distribution ($M_w/M_n$)=1.6.

EXAMPLE 21

[(1,5-cyclooctadiene)Pd(Me)(Cl)]/PMe$_3$/methyl acrylate/norbornene in CH$_2$Cl$_2$ (1:1 methyl acrylate: norbornene)

The procedure of Example 19 was repeated, except that 1.00 g (1.2×10$^{-2}$ mol) of methyl acrylate and 1.140 g (1.2×10$^{-2}$ mol) of norbornene were added to the reaction solution. 0.480 g of polymer product was obtained. The product had a number average molecular weight ($M_n$)=86,400 and a molecular weight distribution ($M_w/M_n$)=1.6.

EXAMPLE 22

[(1,5-cyclooctadiene)Pd(Me)(Cl)]/PMe$_3$/methyl acrylate/norbornene in CH$_2$Cl$_2$ (1:5 methyl acrylate: norbornene)

The procedure of Example 19 was repeated, except that 0.183 g (2.13×10$^{-3}$ mol) of methyl acrylate and 1.000 g (1.06×10$^{-2}$ mol) of norbornene were added to the reaction solution. 0.206 g of polymer product was obtained. The product had a number average molecular weight ($M_n$)=800.

EXAMPLE 23

[(1,5-cyclooctadiene)Pd(Me)(Cl)]/PMe$_3$/methyl acrylate/norbornene in CH$_2$Cl$_2$ (1:10 methyl acrylate: norbornene)

The procedure of Example 14 was repeated, except that 0.137 g (1.60×10$^{-3}$ mol) of methyl acrylate and 1.500 g (1.6×10$^{-2}$ mol) of norbornene were added to the reaction solution. 0.040 g of polymer product was obtained. The product had a number average molecular weight ($M_n$)=800.

EXAMPLE 24

[(1,5-cyclooctadiene)Pd(Me)(Cl)]/pyridine/methyl acrylate/norbornene in CH$_2$Cl$_2$ (10:1 methyl acrylate: norbornene)

In a glove box, under an inert atmosphere (nitrogen), [(1,5-cyclooctadiene)Pd(Me)(Cl)](0.035 g, 1.32×10$^{-4}$ mol) was placed into a 25 mL round bottom flask. To this was added 1 equivalent of pyridine (0.010 g, 1.32×10$^{-4}$ mol), followed by 3 mL of CH$_2$Cl$_2$. The mixture was gently swirled to dissolve the starting materials, thus forming a clear, colorless solution. Next, 1.500 g (1.7×10$^{-2}$ mol) of methyl acrylate and 0.160 g (1.7×10$^{-3}$ mol) of norbornene were dissolved in each other in a beaker, and the resulting solution was added to the flask containing the dissolved [(1,5-cyclooctadiene)Pd(Me)(Cl)] and pyridine. The flask was sealed with a rubber septum and placed in a 50° C. oil bath for 24 hours. Polymer product was obtained by precipitating in methanol, then decanting off liquid and drying under reduced pressure at room temperature. The polymer product was Soxhlet extracted in ether for 16 hours and dried under a vacuum. The product had a number average molecular weight ($M_n$)=23,800 and a molecular weight distribution ($M_w/M_n$)=1.8.

EXAMPLE 25

[(1,5-cyclooctadiene)Pd(Me)(Cl)]/pyridine/methyl acrylate/norbornene in CH$_2$Cl$_2$ (5:1 methyl acrylate: norbornene)

The procedure of Example 25 was repeated, except that 1.500 g (1.7×10$^{-2}$ mol) of methyl acrylate and 0.328 g ($3.49 \times 10^{-3}$ mol) of norbornene were added to the reaction solution. 0.046 g of polymer product was obtained. The product had a number average molecular weight ($M_n$)=75,300 and a molecular weight distribution ($M_w/M_n$)=1.4.

EXAMPLE 26

[(1,5-cyclooctadiene)Pd(Me)(Cl)]/pyridine/methyl acrylate/norbornene in $CH_2Cl_2$ (1:1 methyl acrylate: norbornene)

The procedure of Example 25 was repeated, except that 1.00 g ($1.2 \times 10^{-2}$ mol) of methyl acrylate and 1.140 g ($1.2 \times 10^{-2}$ mol) of norbornene were added to the reaction solution. The product had a number average molecular weight ($M_n$)=8,400 and a molecular weight distribution ($M_w/M_n$)=2.0.

EXAMPLE 27

[(1,5-cyclooctadiene)Pd(Me)(Cl)]/pyridine/methyl acrylate/norbornene in $CH_2Cl_2$ (1:5 methyl acrylate: norbornene)

The procedure of Example 25 was repeated, except that 0.183 g ($2.13 \times 10^{-3}$ mol) of methyl acrylate and 1.000 g ($1.06 \times 10^{-2}$ mol) of norbornene were added to the reaction solution. 0.086 g of polymer product was obtained The product had a number average molecular weight ($M_n$)=75,200 and a molecular weight distribution ($M_w/M_n$)=1.5.

EXAMPLE 28

[(1,5-cyclooctadiene)Pd(Me)(Cl)]/pyridine/methyl acrylate/norbornene in $CH_2Cl_2$ (1:10 methyl acrylate: norbornene)

The procedure of Example 25 was repeated, except that 0.082 g ($9.57 \times 10^{-4}$ mol) of methyl acrylate and 1.000 g ($1.06 \times 10^{-2}$ mol) of norbornene were added to the reaction solution. 0.072 g of polymer product was obtained The product had a number average molecular weight ($M_n$)=26,100 and a molecular weight distribution ($M_w/M_n$)=1.7.

EXAMPLE 29

[(1,5-cyclooctadiene)Pd(Me)(Cl)]/$PPh_3$/n-butyl acrylate in chlorobebzene

In a glove box, under an inert atmosphere (nitrogen), [(1,5-cyclooctadiene)Pd(Me)(Cl)] (0.020 g, $7.56 \times 10^{-5}$ mol) was placed into a 25 mL round bottom flask. To this was added 1 equivalent of $PPh_3$ (0.020 g, $7.56 \times 10^{-5}$ mol), followed by 3 mL of chlorobenzene ($C_6H_5Cl$), and the mixture was gently swirled to dissolve the starting materials, thus forming a clear, colorless solution. Next, 2 g of n-butyl acrylate was added to the solution and the flask was sealed with a rubber septum and placed in a 50° C. oil bath for 24 hours. 0.420 g of polymer product was obtained by precipitating in methanol, then decanting off liquid and drying under reduced pressure at room temperature. The product had a number average molecular weight ($M_n$)=627,000 and a molecular weight distribution ($M_w/M_n$)=1.2.

EXAMPLE 30

[(1,5-cyclooctadiene)Pd(Me)(Cl)]/$PPh_3$/n-butyl acrylate/norbornene in chlorobenzene (1:1.36 n-butyl acrylate:norbornene)

In a glove box, under an inert atmosphere (nitrogen), [(1,5-cyclooctadiene)Pd(Me)(Cl)] (0.020 g, $7.56 \times 10^{-5}$ mol) was placed into a 25 mL round bottom flask. To this was added 1 equivalent of $PPh_3$ (0.020 g, $7.56 \times 10^{-5}$ mol), followed by 3 mL of chlorobenzene, and the mixture was gently swirled to dissolve the starting materials, thus forming a clear, colorless solution. Next, 1.000 g ($7.81 \times 10^{-3}$ mol) of n-butyl acrylate and 1.000 g ($1.06 \times 10^{-2}$ mol) of norbornene were added to the solution. The flask was then sealed with a rubber septum and placed in a 50° C. oil bath for 24 hours. . 0.356 g of polymer product was obtained by precipitating in methanol, and then decanting off liquid and drying under reduced pressure at room temperature. The product had a number average molecular weight ($M_n$) =267,800 and a molecular weight distribution ($M_w/M_n$)=1.5.

EXAMPLE 31

[(1,5-cyclooctadiene)Pd(Me)(Cl)]/$PPh_3$/t-butyl acrylate in chlorobenzene

In a glove box, under an inert atmosphere (nitrogen), [(1,5-cyclooctadiene)Pd(Me)(Cl)] (0.020 g, $7.56 \times 10^{-5}$ mol) was placed into a 25 mL round bottom flask. To this was added 1 equivalent of $PPh_3$ (0.020 g, $7.56 \times 10^{-5}$ mol), followed by 3 ML of chlorobenzene ($C_6H_5Cl$), and the mixture was gently swirled to dissolve the starting materials, thus forming a clear, colorless solution. Next, 1.000 g ($7.81 \times 10^{-3}$ mol) of t-butyl acrylate was added to the solution and the flask was sealed with a rubber septum and placed in a 50° C. oil bath for 24 hours. Polymer product was obtained by precipitating in methanol, and then decanting off liquid and drying under reduced pressure at room temperature. The product had a number average molecular weight ($M_n$)=550,000 and a molecular weight distribution ($M_w/M_n$)=1.2.

EXAMPLE 32

[(1,5-cyclooctadiene)Pd(Me)(Cl)]/$PPh_3$]/t-butyl acrylate/norbornene in chlorobenzene (1:1 t-butyl acrylate:norbornene)

In a glove box, under an inert atmosphere (nitrogen), [(1,5-cyclooctadiene)Pd(Me)(Cl)] (0.020 g, $7.56 \times 10^{-5}$ mol) was placed into a 25 mL round bottom flask. To this was added 1 equivalent of $PPh_3$ (0.020 g, $7.56 \times 10^{-5}$ mol), followed by 3 ML of chlorobenzene, and the mixture was gently swirled to dissolve the starting materials, thus forming a clear, colorless solution. Next, 1.000 g ($7.81 \times 10^{-3}$ mol) of t-butyl acrylate and 1.000 g ($1.06 \times 10^{-2}$ mol) of norbornene were added to the solution. The flask was then sealed with a rubber septum and placed in a 50° C. oil bath for 24 hours. Polymer product was obtained by precipitating in methanol, then decanting off liquid and drying under reduced pressure at room temperature

EXAMPLE 33

[(1,5-cyclooctadiene)Pd(Me)(Cl)]/$PPh_3$/n-butyl acrylate in hexane

In a glove box, under an inert atmosphere (nitrogen), [(1,5-cyclooctadiene)Pd(Me)(Cl)] (0.020 g, $7.56 \times 10^{-5}$ mol) was placed into a 25 mL round bottom flask. To this was added 1 equivalent of $PPh_3$ (0.020 g, $7.56 \times 10_{-5}$ mol), followed by 3 mL of hexane ($C_6H_{14}$), and the mixture was gently swirled to dissolve the starting materials, thus forming a clear, colorless solution. Next, 2 g ($1.56 \times 10^{-2}$ mol) of butyl acrylate was added to the solution and the flask was sealed with a rubber septum and placed in a 50° C. oil bath for 24 hours. Polymer product was obtained by precipitating in methanol, then decanting off liquid and drying under reduced pressure at room temperature. The product had a number average molecular weight $(M_n)$=127,000 and a molecular weight distribution $(M_w/M_n)$=1.3.

EXAMPLE 34

[(1,5-cyclooctadiene)Pd(Me)(Cl)]/PPh$_3$methyl methacrylate in benzene

In a glove box, under an inert atmosphere (nitrogen), [(1,5-cyclooctadiene)Pd(Me)(Cl)] (0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of benzene (C$_6$H$_6$), and the mixture was gently swirled to dissolve the starting materials, thus forming a clear, colorless solution. Next, 2 g of methyl methacrylate was added to the solution and the flask was sealed with a rubber septum stirred at 50° C. for 24 hours. Polymer product was obtained by precipitating in methanol, then decanting off liquid and drying under reduced pressure at room temperature. 0.025 g of polymer product was obtained. The product had a number average molecular weight $(M_n)$= 193,000 and a molecular weight distribution $(M_w/M_n)$=1.5.

EXAMPLE 35

[(1,5-cyclooctadiene)PdMe)(Cl)]/PPh$_3$/ethyl acrylate in CH$_2$Cl$_2$.

In a glove box, under an inert atmosphere (nitrogen), [(1,5-cyclooctadiene)Pd(Me)(Cl)](0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of dichloromethane (CH$_2$Cl$_2$), and the mixture was gently swirled to dissolve the starting materials, thus forming a clear, colorless solution. Next, 2 g (2.0×10$^{-2}$ mol) of ethyl acrylate was added to the solution and the flask was sealed with a rubber septum stirred at 50° C. for 24 hours. Polymer product was obtained by precipitating in methanol, then decanting off liquid and drying under reduced pressure at room temperature. 0.837 g of polymer product was obtained. The product had a number average molecular weight $(M_n)$=127,000 and a molecular weight distribution $(M_w/M_n)$=1.3.

EXAMPLE 36

[(1,5-cyclooctadiene)Pd(Me)(Cl)]/PPh$_3$/methyl acrylate/norbornene in CH$_2$Cl$_2$ (1:1 methyl acrylate:norbornene ratio)

In a glove box, under an inert atmosphere (nitrogen), [(1,5-cyclooctadiene)Pd(Me)(Cl)] (0.020 g, 7.56×10$^{-5}$ mol) was placed into a 25 mL round bottom flask. To this was added 1 equivalent of PPh$_3$ (0.020 g, 7.56×10$^{-5}$ mol), followed by 3 mL of dichloromethane (CH$_2$Cl$_2$), and the mixture was gently swirled to dissolve the starting materials, thus forming a clear, colorless solution. Next, 1 g (1.2×10$^{-2}$ mol) of methyl acrylate and 1.120 g (1.2×10$^{-2}$ mol) of norbornene were added to the solution and the flask was sealed with a rubber septum stirred at 50°C. for 24 hours. Polymer product was obtained by precipitating in methanol, then decanting off liquid and drying under pressure at room temperature. The product had a number average molecular $(M_n)$=40,000 and a molecular weight distribution $(M_w/M_n)$= 1.4.

As discussed briefly above, and as will be more readily apparent in view of the foregoing examples and the following table, the properties of the copolymers can be tailored by the ratio of the respective monomers in the reaction mixture and by varying the utilized in the catalyst system. Varying the ratio of acrylate monomer to norbornene monomer effects the properties of the copolymers in that increasing the ratio of one of the monomer reactants increases its presence in the copolymer product. In instances of a very high ratio of one monomer relative to the other (for example, in 10:1 and 1:10 monomer ratio reactions) the resulting copolymer product consists of long strings of repeating units of the abundant monomer with a few units of the less abundant monomer. Thus, polymer products having a high acrylate content, e.g., high methyl content, tend to be somewhat tacky, whereas polymers having a high norbornene content are white powdery substances. Varying the ligand used in the reaction and/or varying the reactant monomer ratio also effects the molecular weight of the copolymer product. Thus, referring to the following table, it can be seen that the molecular weight of the copolymer product increased as the ratio of acrylate monomer to norbornene monomer increased from 1:1 to 10:1 when PPh$_3$ was used as the ligand (Examples 9–11), when PCy$_3$ was used as the ligand (Examples 14–16), and when PMe$_3$ was used as the ligand Examples 19–21). It also can be seen that the use of pyridine as the ligand generally resulted in the production of lower molecular weight copolymers, whereas the use of triphenyl phosphine as the ligand tended to produce higher molecular weight copolymers.

| Example No. | Ligand | Methyl Acrylate/ Norbornene Reactant Molar Ratio | $M_n$ (Daltons) | $M_w/M_n$ |
| --- | --- | --- | --- | --- |
| 9 | PPh$_3$ | 10:1 | 429,700 | 2.1 |
| 10 | PPh$_3$ | 5:1 | 380,000 | 2.0 |
| 11 | PPh$_3$ | 1:1 | 60,400 | 1.7 |
| 12 | PPh$_3$ | 1:5 | 122,000 | 1.5 |
| 13 | PPh$_3$ | 1:10 | 274,400 | 1.5 |
| 14 | PCy$_3$ | 10:1 | 429,700 | 2.1 |
| 15 | PCy$_3$ | 5:1 | 238,500 | 1.5 |
| 16 | PCy$_3$ | 1:1 | 39,800 | 1.8 |
| 19 | PMe$_3$ | 10:1 | 363,700 | 1.4 |
| 20 | PMe$_3$ | 5:1 | 249,500 | 1.6 |
| 21 | PMe$_3$ | 1:1 | 86,400 | 1.6 |
| 24 | Pyridine | 10:1 | 23,800 | 1.8 |
| 25 | Pyridine | 5:1 | 75,300 | 1.4 |
| 26 | Pyridine | 1:1 | 8,400 | 2.0 |
| 27 | Pyridine | 1:5 | 75,200 | 1.5 |
| 28 | Pyridine | 1:10 | 26,100 | 1.7 |

While the present invention has been described and exemplified above, it is to be understood that the invention is not limited to the details of the illustrative embodiments and examples, but may be embodied with various changes and modifications which may occur to those skilled in the art, without departing from the spirit and scope of the invention defined in the following claims.

What is claimed is:

1. A method of synthesizing polymers from acrylates, norbornenes and mixtures thereof, which comprises contacting under polymerization conditions and in the presence of a solvent (a) at least one monomer selected from the group consisting of acrylates, norbornenes and mixtures thereof with (b) a catalyst system consisting essentially of a Pd(II) dimer component having the formula:

$$[(L)Pd(R)(X)]_2,$$

wherein L is a monodentate phosphorus or nitrogen ligand, X is an anionic group, and R is an alkyl or aryl group.

2. The method of claim 1, wherein R is selected from the group consisting of ethyl, methyl, propyl, isopropyl, n-butyl, t-butyl, and X is selected from the group consisting of Cl, Br and carboxylate.

3. The method of claim 1, wherein said at least one monomer is selected from the group consisting of acrylate monomers.

4. The method of claim 1, wherein said at least one monomer is selected from the group consisting of norbornene monomers.

5. The method of claim 1, wherein said at least one monomer comprises a mixture of at least one acrylate monomer and at least one norbornene monomer.

6. The method of claim 2, wherein L is selected from the group consisting of aromatic and heterocyclic amines and compounds conforming to the formula $R^2{}_3P$, where $R^2$ is selected from alkyl groups, aryl groups and mixtures thereof.

7. The method of claim 6, wherein L is selected from the group consisting of triphenyl phosphine ($PPh_3$), tricyclohexyl phosphine ($PCy_3$), trimethyl phosphine ($PMe_3$), triethyl phosphine ($PEt_3$), tri-n-propyl phosphine ($P(n-Pr)_3$), tri-n-butyl phosphine ($P(n-Bu)_3$), tri-t-butyl phosphine ($P(t-Bu)_3$), tri-p-tolyl phosphine ($P(p-Tol)_3$), methyldiphenyl phosphine ($P(Me)(Ph)_2$), phenyldimethyl phosphine ($PPh(Me)_2$), ethyldiphenyl phosphine ($P(Et)(Ph)_2$), pyridine, t-butyl pyridine, aniline, trimethyl aniline and imidazole.

8. The method of claim 3, wherein L is selected from the group consisting of aromatic and heterocyclic amines and compounds conforming to the formula $R^2{}_3P$, where $R^2$ is selected from alkyl groups, aryl groups and mixtures thereof.

9. The method of claim 8, wherein L is selected from the group consisting of triphenyl phosphine ($PPh_3$), tricyclohexyl phosphine ($PCy_3$), trimethyl phosphine ($PMe_3$), triethyl phosphine ($PEt_3$), tri-n-propyl phosphine ($P(n-Pr)_3$), tri-n-butyl phosphine ($P(n-Bu)_3$), tri-t-butyl phosphine ($P(t-Bu)_3$), tri-p-tolyl phosphine ($P(p-Tol)_3$), methyldiphenyl phosphine ($P(Me)(Ph)_2$), phenyldimethyl phosphine ($PPh(Me)_2$), ethyldiphenyl phosphine ($P(Et)(Ph)_2$), pyridine, t-butyl pyridine, aniline, trimethyl aniline and imidazole.

10. The method of claim 4, wherein L is selected from the group consisting of aromatic and heterocyclic amines and compounds conforming to the formula $R^2{}_3P$, where $R^2$ is selected from alkyl groups, aryl groups and mixtures thereof.

11. The method of claim 10, wherein L is selected from the group consisting of triphenyl phosphine ($PPh_3$), tricyclohexyl phosphine ($PCy_3$), trimethyl phosphine ($PMe_3$), triethyl phosphine ($PEt_3$), tri-n-propyl phosphine ($P(n-Pr)_3$), tri-n-butyl phosphine ($P(n-Bu)_3$), tri-t-butyl phosphine ($P(t-Bu)_3$), tri-p-tolyl phosphine ($P(p-Tol)_3$), methyldiphenyl phosphine ($P(Me)(Ph)_2$), phenyldimethyl phosphine ($PPh(Me)_2$), ethyldiphenyl phosphine ($P(Et)(Ph)_2$), pyridine, t-butyl pyridine, aniline, trimethyl aniline and imidazole.

12. The method of claim 5, wherein L is selected from the group consisting of aromatic and heterocyclic amines and compounds conforming to the formula $R^2{}_3P$, where $R^2$ is selected from alkyl groups, aryl groups and mixtures thereof.

13. The method of claim 12, wherein L is selected from the group consisting of triphenyl phosphine ($PPh_3$), tricyclohexyl phosphine ($PCy_3$), trimethyl phosphine ($PMe_3$), triethyl phosphine ($PEt_3$), tri-n-propyl phosphine ($P(n-Pr)_3$), tri-n-butyl phosphine ($P(n-Bu)_3$), tri-t-butyl phosphine ($P(t-Bu)_3$), tri-p-tolyl phosphine ($P(p-Tol)_3$), methyldiphenyl phosphine ($P(Me)(Ph)_2$), phenyldimethyl phosphine ($PPh(Me)_2$), ethyldiphenyl phosphine ($P(Et)(Ph)_2$), pyridine, t-butyl pyridine, aniline, trimethyl aniline and imidazole.

14. The method of claim 2, wherein L is selected from the group consisting of compounds conforming to the formula $R^3{}_3N$, where $R^3$ is selected from the group consisting of alkyl groups, aryl groups and mixtures thereof.

15. The method of claim 14, wherein $R^3$ is selected from the group consisting of methyl ($CH_3$), ethyl ($CH_2CH_3$), propyl ($CH_2CH_2CH_3$), n-butyl ($CH_2CH_2CH_2CH_3$), t-butyl ($C—(CH_3)_3$), phenyl ($C_6H_6$) and p-tolyl ($C_7H_8$) and mixtures thereof.

16. The method of claim 3, wherein L is selected from the group consisting of compounds conforming to the formula $R^3{}_3N$, where $R_3$ is selected from the group consisting of alkyl groups, aryl groups and mixtures thereof.

17. The method of claim 16, wherein $R^3$ is selected from the group consisting of methyl ($CH_3$), ethyl ($CH_2CH_3$), propyl ($CH_2CH_2CH_3$), n-butyl ($CH_2CH_2CH_2CH_3$), t-butyl ($C—(CH_3)_3$), phenyl ($C_6H_6$) and p-tolyl ($C_7H_8$) and mixtures thereof.

18. The method of claim 4, wherein L is selected from the group consisting of compounds conforming to the formula $R^3{}_3N$, where $R^3$ is selected from the group consisting of alkyl groups, aryl groups and mixtures thereof.

19. The method of claim 18, wherein $R^3$ is selected from the group consisting of methyl ($CH_3$), ethyl ($CH_2CH_3$), propyl ($CH_2CH_2CH_3$), n-butyl ($CH_2CH_2CH_2CH_3$), t-butyl ($C—(CH_3)_3$), phenyl ($C_6H_6$) and p-tolyl ($C_7H_8$) and mixtures thereof.

20. The method of claim 5, wherein L is selected from the group consisting of compounds conforming to the formula $R^3{}_3N$, where $R^3$ is selected from the group consisting of alkyl groups, aryl groups and mixtures thereof.

21. The method of claim 20, wherein $R^3$ is selected from the group consisting of methyl ($CH_3$), ethyl ($CH_2CH_3$), propyl ($CH_2CH_2CH_3$), n-butyl ($CH_2CH_2CH_2CH_3$), t-butyl ($C—(CH_3)_3$), phenyl ($C_6H_6$) and p-tolyl ($C_7H_8$) and mixtures thereof.

22. The method of claim 3, wherein said acrylate monomer is selected from the group consisting of 2-hydroxyethyl methacrylate, methyl methacrylate, ethyl methacrylate and compounds of the formula $H_2C=CHCOOR$, where R is an alkyl group or an aryl group.

23. The method of claim 3, wherein R is selected from the group consisting of methyl ($CH_3$), ethyl ($CH_2CH_3$), propyl ($CH_2CH_2CH_3$), n-butyl ($CH_2CH_2CH_2CH_3$), t-butyl ($C—(CH_3)_3$), phenyl ($C_6H_6$) and p-tolyl ($C_7H_8$).

24. The method of claim 4, wherein said norbornene monomer is selected from the group consisting of norbornene, norbornadiene and compounds conforming to the formulas 5-norbornene-2-$R^{1a}$, 5-norbornene-2,2-$R^{1a}$, 5-norbornene-3-$R^{1a}$, 5-norbornene-3,3-$R^{1a}$, 5-norbornene-2,3-$R^{1a}$, or 5-norbornene-2-$R^{1a}$-3-$R^{1b}$, where $R^{1a}$ and $R^{1b}$, independently, represent an alkyl or aryl group, or a residue of an alcohol or carboxylic acid.

25. The method of claim 4, wherein said norbornene monomer is selected from the group consisting of norbornene, 5-norbornene-2-methanol, cis-5-norbornene-endo-2,3-dicarboxylic anhydride, 5-norbornene-2,2-dimethanol, 5-norbornen-2-ol, norbornadiene, 5-norbornene-2,3-diphenyl, cis-5-norbornene-endo-2,3-dicarboxylic acid dimethyl ester, 5-norbornen-2-yl-acetate and 5-norbornene-2-carboxyaldehyde.

26. The method of claim 5, wherein at least one acrylate monomer is selected from the group consisting of 2-hydroxyethyl methacrylate, methyl methacrylate, ethyl methacrylate, acrylamide, acrolein, acryloyl chloride, and compounds of the formula $H_2C=CHCOOR$, where R is an alkyl group or an aryl group; and wherein at least one norbornene monomer is selected from the group consisting of norbornene, norbornadiene and compounds conforming to the formulas 5-norbornene-2-$R^{1a}$, 5-norbornene-2,2-$R^{1a}$, 5-norbornene-3-$R^{1a}$, 5-norbornene-3,3-$R^{1a}$, 5-norbornene-2,3-$R^{1a}$, or 5-norbornene-2-$R^{1a}$-3-$R^{1b}$, where $R^{1a}R^{1b}$, independently, represent an alkyl or aryl group, or a residue of an alcohol or carboxylic acid.

27. The method of claim 5, wherein the ratio of acrylate monomer to norbornene monomer added to the polymerization reaction is from about 100:1 to about 1:100.

28. The method of claim 5, wherein the ratio of acrylate monomer to norbornene monomer added to the polymerization reaction is from about 10:1 to about 1:10.

29. The method of claim 26, wherein the ratio of acrylate monomer to norbornene monomer added to the polymerization reaction is from about 100:1 to about 1:100.

30. The method of claim 26, wherein the ratio of acrylate monomer to norbornene monomer added to the polymerization reaction is from about 10:1 to about 1:10.

* * * * *